(12) United States Patent
Masseron et al.

(10) Patent No.: US 9,715,284 B2
(45) Date of Patent: Jul. 25, 2017

(54) METHOD FOR SELECTING AN ENTRY FOR AN APPLICATION USING A GRAPHICAL USER INTERFACE

(71) Applicant: ORANGE, Paris (FR)

(72) Inventors: Stéphane Masseron, London (GB); Asheesh Sangamneheri, London (GB)

(73) Assignee: Orange, Paris (FR)

( * ) Notice: Subject to any disclaimer, the term of this patent is extended or adjusted under 35 U.S.C. 154(b) by 74 days.

(21) Appl. No.: 14/751,475

(22) Filed: Jun. 26, 2015

(65) Prior Publication Data

US 2015/0378446 A1    Dec. 31, 2015

(30) Foreign Application Priority Data

Jun. 27, 2014  (EP) .................................... 14306031

(51) Int. Cl.
*G06F 3/03*     (2006.01)
*G06F 3/0482*   (2013.01)
*G06F 3/0481*   (2013.01)

(52) U.S. Cl.
CPC .............. *G06F 3/03* (2013.01); *G06F 3/0482* (2013.01); *G06F 3/04817* (2013.01)

(58) Field of Classification Search
CPC ....... G06F 3/03; G06F 3/04817; G06F 3/0482
See application file for complete search history.

(56) References Cited

U.S. PATENT DOCUMENTS

| 6,857,105 B1 * | 2/2005 | Fox ....................... G06F 3/0482 715/808 |
| 2009/0083668 A1 | 3/2009 | Aizawa et al. |
| 2010/0083150 A1 | 4/2010 | Nurmi et al. |
| 2012/0254805 A1 | 10/2012 | Pic et al. |

FOREIGN PATENT DOCUMENTS

| EP | 1712983 A2 | 10/2006 |
| EP | 1770485 A2 | 4/2007 |

OTHER PUBLICATIONS

Search Report issued by the European Patent Office in related application EP14306031.7, dated Jan. 20, 2015, 6 pages.

* cited by examiner

*Primary Examiner* — Viet Pham
(74) *Attorney, Agent, or Firm* — Drinker Biddle & Reath LLP

(57) ABSTRACT

A method for executing an application through a user interface displayed by an electronic device includes the steps of displaying on the user interface at least one application icon, an application icon being associated to an application, displaying on the user interface at least one input icon, an input icon being associated to an input mode for one or more applications, one of the at least one application icon or the at least one input icon being part on the user interface of a list of icons movable along a first direction of the user interface, capturing one or more user inputs along the first direction to move the list of icons in the first direction, detecting a user input linking an input icon with an application icon to select respectively the associated input mode and application, and executing the selected application using the selected input mode.

13 Claims, 6 Drawing Sheets

METHOD FOR SELECTING AN ENTRY FOR AN APPLICATION USING A GRAPHICAL USER INTERFACE

CROSS-REFERENCE TO RELATED PATENT APPLICATION

This application claims the benefit of European Patent Application No. 14306031.7, filed in the European Patent Office on Jun. 27, 2014, the entire contents of which are incorporated herein by reference.

FIELD

The present disclosure relates in general to user interfaces on an electronic device. More particularly, the present disclosure relates to a method for executing applications through such user interfaces.

BACKGROUND

Today electronic devices like smartphones offer various user interactions through graphical user interfaces (GUIs). Such interactions may be for instance entered through touch inputs from the user or a stylus. The interactions may be used to implement various functions of an application running on the electronic device. Such functions may be e.g. selections of entries presented to the user through a GUI, or a series of inputs to use a selected input as a parameter to execute an application. Uploading a picture to a social network application falls is such an example.

Among possible GUIs proposed to the user, scrollable or movable lists of entries, presented to the user through a list of entries movable in a first direction of the user interface, offer an interesting user experience for an easy selection.

An example of a known scrollable list is taught in document US2001299599, wherein a list of entries may be moved in a scrolling direction. A first entry from the list may be selected through capturing a user input on the scrollable list to move the list from a first to a second position, in the scrolling direction. A further entry like a sliding input from a user on a first entry of the list and in a direction distinct from the scrolling direction will lead to the selection of the first.

Such a selection method may be available within an application. Nevertheless it is a not available across applications if an application developer does not offer its implementation. Furthermore it only allows the feeding of the selected parameters to an application for further use. But that does not allow an easy selection of an entry mode for the same application. Reusing the social network application example, a user will still have to select the camera input and browse a scrollable list of pictures before selecting one for uploading to his wall, i.e. his social network page. Transposed to a check-in, he will have to select through a scrollable list of possible locations the one he wants to check into for posting a check-in on his wall. If he wants to post a location or a picture on a different application, even if offered through a scrollable list, he will have to resume to process for the other application.

Today there is still a need for an improved selection method within an application. There is a further need for such an improved method that works across applications.

SUMMARY

It is an object of the present system to overcome disadvantages and/or make improvements in the prior art. The present system relates to a method for executing an application through a user interface displayed by an electronic device, the method comprising the steps of:

displaying on the user interface at least one application icon, an application icon being associated to an application, displaying on the user interface at least one input icon, an input icon being associated to an input mode for one or more applications, one of the at least one application icon or the at least one input icon being part on the user interface of a list of icons movable along a first direction of the user interface, capturing one or more user inputs along the first direction to move the list of icons in the first direction, detecting a user input linking an input icon with an application icon to select respectively the associated input mode and application, executing the selected application using the selected input mode.

Such a method enables an easy selection of an "input mode/application" pair without the need to launch the application itself and search through its menu the intended action. Each list may be seen as a carrousel displaying the different application or input icons. Such an approach allows the use of various input modes across various applications or functions of a same application. The user is given through the present GUI the possibility of choosing which entry mode he will use with which application. It enables a different yet shorter entry point into the application or module of an application with the input mode already selected.

The present system is particularly advantageous for implementing as an application launcher (in short "launcher"), allowing for quick launch of a given application with an input mode selected by a user.

The present system also describes an electronic device according to claim 9 and a computer program according to claim 10.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to the disclosure may in particular be downloaded from a network of Internet type.

BRIEF DESCRIPTION OF THE DRAWINGS

One or more examples of the present disclosure are explained in further detail, and by way of example, with reference to the accompanying drawings wherein.

DETAILED DESCRIPTION

Figure 1:
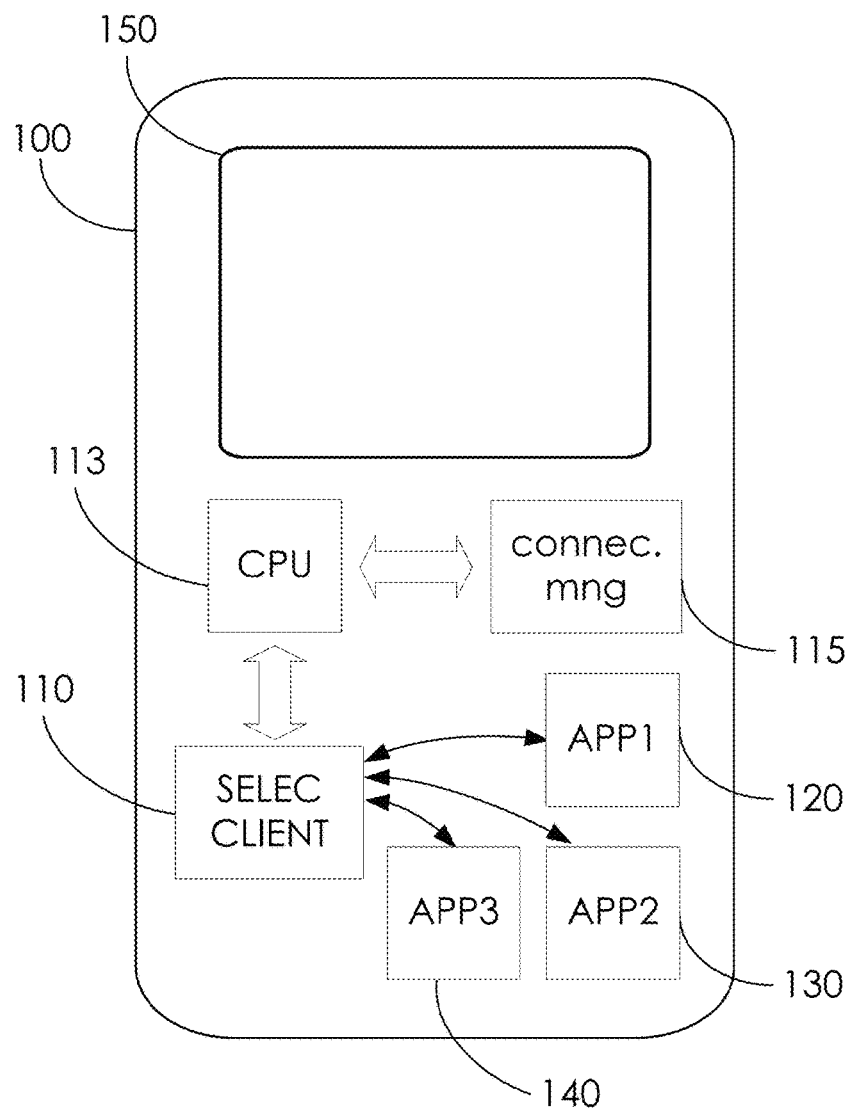
FIG. 1 shows an exemplary embodiment of an electronic device in accordance with the present system.

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device so that it may be seen and interacted with by a user. The term rendering may also comprise all the steps required to generate a GUI prior to the display, like e.g. the retrieval in a database of the registered input types and applications prior to their respective rendering through two scrollable lists.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof, either directly or indirectly. An operative coupling may also include a wired and/or wireless coupling to enable communication between an application server storage a database of registered applications and input modes, and one or more user devices in accordance with an embodiment of the present system. An operative coupling may also relate to an interaction between program portions and thereby may not describe a physical connection so much as an interaction based coupling.

The system, device(s), method, user interface, etc., described herein address problems in prior art systems. In accordance with an embodiment of the present system, an electronic device provides a GUI for selecting an entry/input to be used by an application program (AP) through user inputs, such e.g. as touch or mouse inputs.

In the description hereafter, reference will be made to an electronic device such as a mobile device or handsets. This is in no way a limitation of the present method as the teaching herein may be applied to any electronic device capable of displaying a GUI a user may interact with.

A GUI is a type of user interface which allows a user to interact with electronic devices such as computers, handheld devices such as smartphones or tablets, household appliances, office equipment and the likes. GUIs are typically used to render visual and textual images which describe various visual metaphors of an operating system, an application, etc. and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars or lists, maps, etc. Such images can be arranged in predefined layouts, or can be created dynamically (by the device itself or by a web-based server) to serve the specific steps being taken by a user. In general, the user can select and/or activate various graphical images in order to initiate functions and tasks, i.e. controls, associated therewith. By way of example, a user can select a button that opens, closes, minimizes, or maximizes a window, a virtual representation or an icon that launches a particular application program. By way of another example, the GUI may present a typical user interface including a windowing environment and as such, may include menu items, pull-down menu items, icons, pop-up windows, scrollable lists, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system (OS).

The present system describes a method for triggering an application selected in a first scrollable list using an input selected from a second scrollable list that is used as an input or input method for the selected application. To do so, a user input encompassing the selected input with the selected application is provided on the GUI. By encompassing one may understand a user input like a sliding, pinching or else, in the direction across the two lists. It should be noted that the word direction is used hereafter without notion of orientation; meaning that no restriction is done on the way along a direction a user gesture is performed. As an illustration, a user sliding along a horizontal direction could be performed right-to-left or left-to-right, unless specified otherwise. The method may be implemented on a touch display. For this reason user inputs are considered to be mainly user gesture on the display, for example sliding gesture. Thus, in the following text "user input" or "user gesture" expressions will be indifferently used. However, this should not be considered as a limitation as the present method could also be implemented using other user input via other input device, like for example a computer mouse, a touch pen or any other input device commonly used with an electronic device. Alternatively, the present method could be implemented on an electronic device such as a pair of glasses, for example a pair of glasses as developed in Google™ glass project. In this case, the display would be a virtual display or a display projected on any surface, here the surface of the pair of glasses. User input in this case, may be gesture that can be captured with a device similar to Microsoft™ Kinect, possibly integrated in the pair of glasses, or detection of user's retina movement.

In the description here after, an application program (AP)—or software—may be seen as any tool that functions and is operated by means of a computer, with the purpose of performing one or more functions or tasks for a user or another application program. To interact with and control an AP, a GUI of the AP may be displayed on the user device display. The application may also refer to just one function or module of a software as will be described in further details here after.

FIG. 1 is an illustration of an exemplary user device 100 used in the present system. In the hereafter description, the user or electronic device will be illustrated as a mobile device 100 with a touch interface 150. The mobile device 100 comprises a display device/touch interface 150, a processor 113, and a connection manager 115 for exchanging data over a telecommunication network.

Processor 113 may control the rendering and/or the display of the GUI on the display device 150 depending on the type of application program. Processor 110 may also handle the user entries according to the present method. The user entries to interact with an application program may be provided through interactions with the display device/touch panel 150. The touch panel 150 can be based on sensing technologies including but not limited to capacitive sensing, resistive sensing, surface acoustic wave sensing, pressure sensing, optical sensing, and/or the likes.

In the present system, a number of different applications may be provided with the mobile device 100. A series of application programs APP1 to APP3 are illustrated at the respective reference numbers 120 to 140. Such applications may be for instance social network, email or news applications. Such applications allow users to post inputs using different input modes (not shown in FIG. 1) such as text, camera, location, microphone and the likes.

Figure 3A:
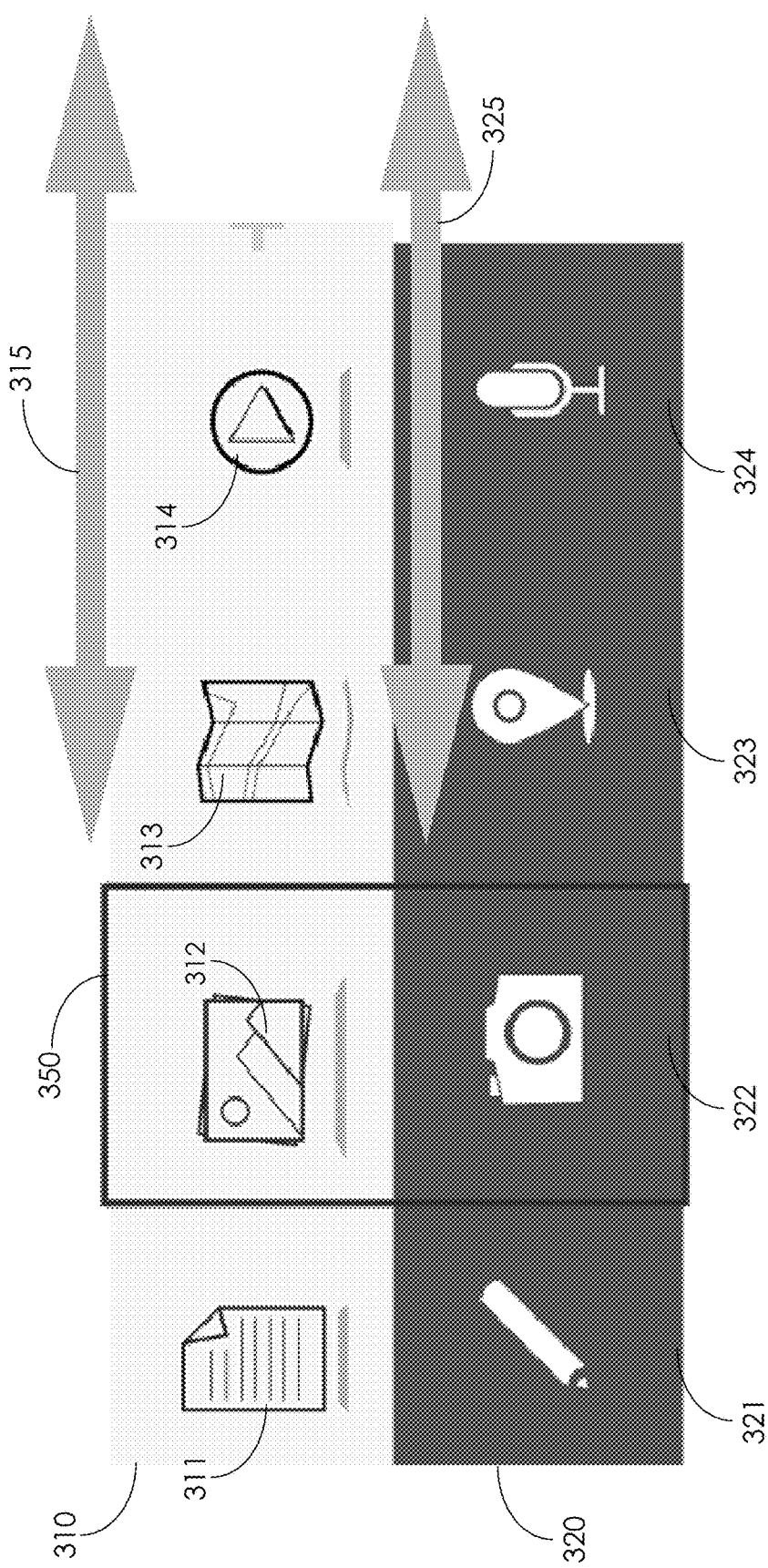
FIGS. 3A, 3B and 3C show exemplary GUIs for the execution of an application with selected inputs in accordance with additional embodiments of the present system; and, FIG. 4 shows an exemplary GUI for present method in accordance with another embodiment of the present system.
Figure 3B:
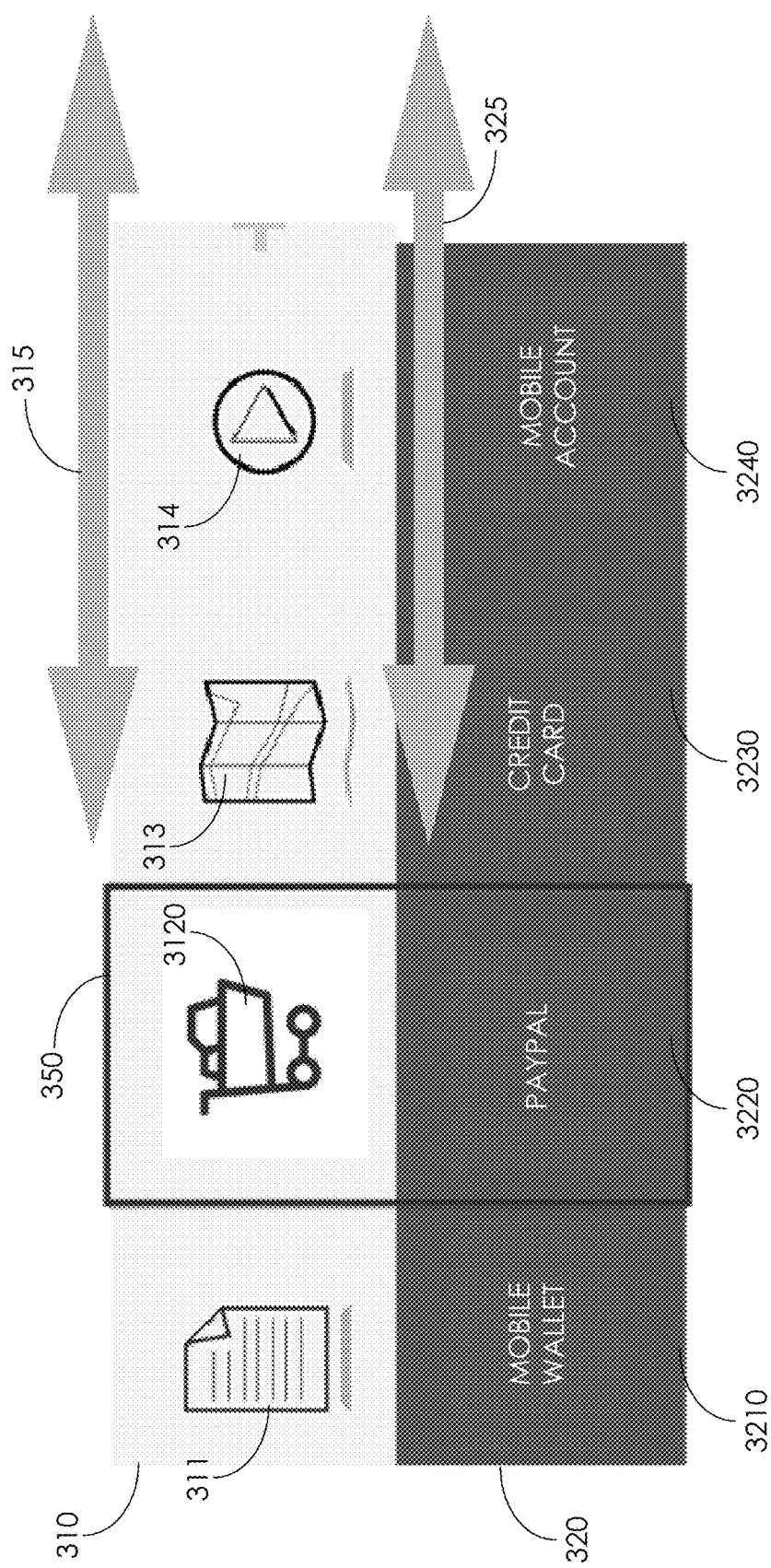
Figure 4:
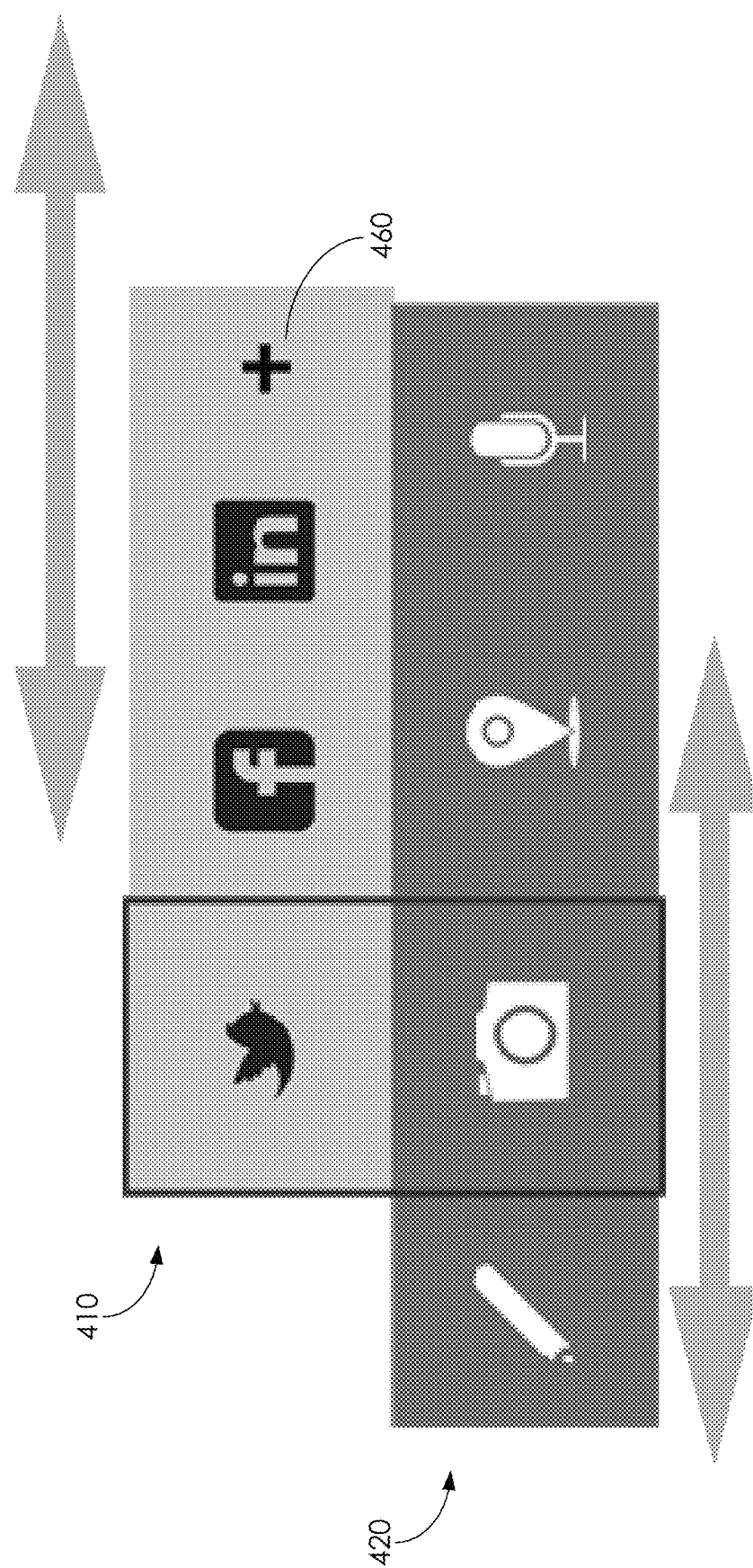

A selection client 110 is provided here to display the GUI of the present system, as seen in the exemplary embodiments of FIGS. 3A, 3B and 4. The selection client corresponds to a plugin architecture implementation which allows the number of applications and input modes to be scalable. In such an embodiment, as seen here after, the registered applications and input modes can be dynamically updated so as to include new applications or input modes as becoming available to the electronic device.

In an alternative embodiment, the present selection system may be available through a plugin component that would be packaged with a regular application to enable the present selection GUI. The recipients of the input modes may be modules or function of the application itself. The plugin component would be called by the regular application using its different input modes and modules. This implementation will be referred to the plugin component implementation.

In another alternative embodiment of the present system, the GUI may be rendered through a standalone application that is configured to display such a selection type of GUI with a first movable list of functions/modules and a second movable list of input modes of the application. This embodiment will be referred to the standalone application implementation.

Figure 2:
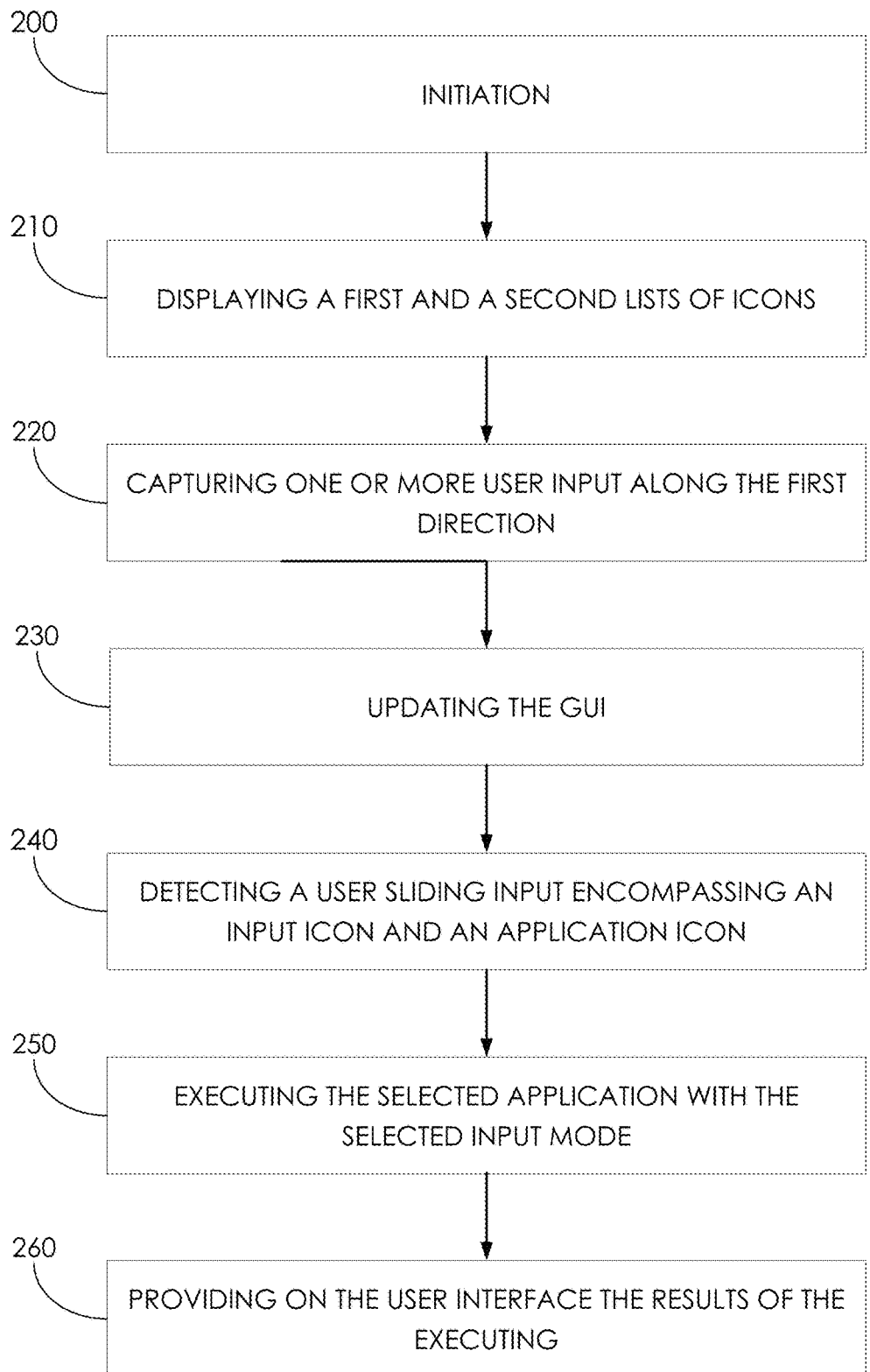
FIG. 2 shows an exemplary flowchart for the execution of an application with a selected input according to an embodiment of the present system.

In the present system, the applications available in the first list may be seen as the recipients to the input modes of the second list. FIG. 2 shows an exemplary flowchart for the selection of an input or entry mode and an application according to an embodiment of the present system. The present system will be illustrated, unless mentioned otherwise, in connection with plugin architecture implementation, using the selection client 110.

In the present system, there are two types of elements:
the elements of a first type, i.e. the applications, that may be seen as the output elements of the present system as using the selected input to produce one or more results. They are displayed on a first movable list,
the elements of a second type, i.e. the input modes. They may be seen as input elements. They are displayed on the second movable list. One may note that the input elements may refer to the input mode of entry itself, e.g. providing an editor for a text, triggering the camera to capture an image, triggering the location sensor to measure the current location of the device . . . Alternatively, the element of the second type may refer to an entry itself, i.e. a text, an image, a location . . . in other words the entry value itself.

In an initiation step 200, the selection client 110 will register the different elements, i.e. the input modes and the applications that are eligible to the present system. In the present system, each eligible element is associated with:
an icon representation to be used in the present GUI,
metadata describing what data the element is compatible with. These metadata may be seen as extension files. In other words, each element of one type in the present system will be associated with metadata/extension files describing which elements of the other type it is compatible with.

Such an implementation could be device based or through a client-server setup. Such a registration server would host the extension files for each input and output elements. Whether device or server based, the registration of the different elements may be enabled through maintaining lists of elements of each type in a database (not shown in FIG. 1) the selection client 110 is operatively connected with.

Each time the selection client 110 is launched, it will retrieve in the database the list of registered elements, including any new ones once registered with the registration server. Alternatively, for device based implementation, any new element could register directly with the selection client 110.

A new element may be available for instance whenever the user downloads a new application, e.g. a new social network application. Its corresponding extension file may be defined using an API (Application Program Interface) that would be used by any input/output element. The extension file may also comprise an icon representation to be used when displaying the different lists of elements.

The icons for the elements of the input type will be referred to here after as the input icons while the icons for the elements of the output type will be referred to as the output or application icons.

Figure 3C:
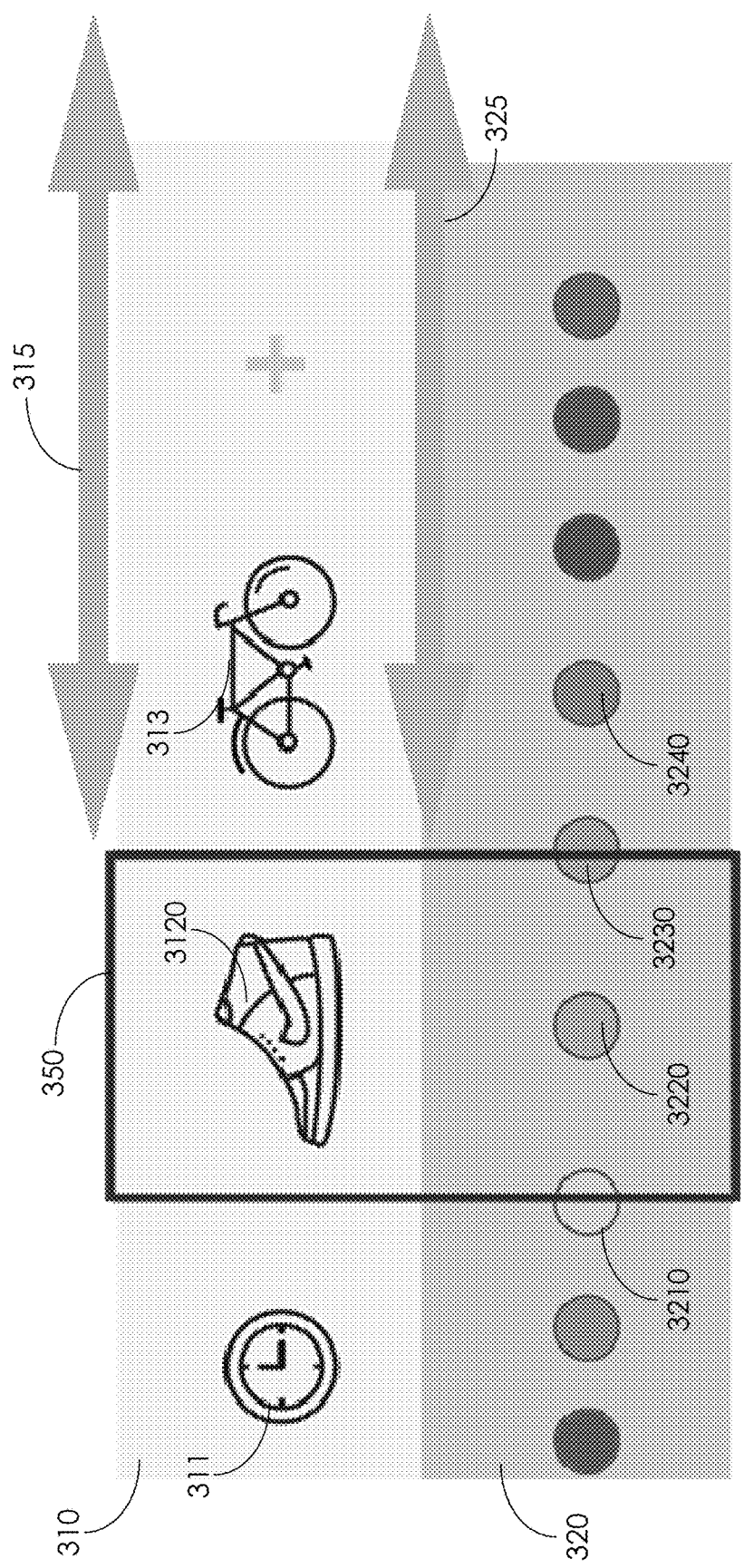

In a further step 210, the processor of the electronic device 100 will display on a user interface a first list of application or output icons 311-314 movable along a first direction of the user interface, each application icon being associated to an application, Such a list 310 is seen in FIGS. 3A to 3C while the list corresponds to 410 in FIG. 4. Similarly, a second list of input icons 321-324 movable along the same first direction is displayed on the GUI of display device 150. This corresponds to list 320 in FIG. 3A-3C and list 420 in FIG. 4. The identical scrollable directions for the movable lists are direction 315 for the first list 310 and direction 325 for the second list 320. Both lists are movable through user inputs as described here after.

In a further step 220, the user of the mobile device 100 will provide inputs e.g. along the first direction 315/325 to move, i.e. reposition the first and/or second lists with respect with each other. The GUI will be updated by the device processor in a further step 230 based on the provided user inputs. As with known scrollable lists, the user may have the impression that the list he is currently touching or selecting is following his input as he moves his finger along direction 315/325. The provided user inputs in step 220 allow to position the icon 322 for the target input mode in proximity with, here illustrated as directly opposite the icon 312 for the targeted application.

In an additional embodiment of the present system, the GUI may present an additional graphical element like the guide 350 to help the user with selecting the input and application icons he is interested in. The guiding element 350 may be e.g. a rectangular frame encompassing at least one icon from each list. The user will then provide the inputs of step 220 so as to position the icon 322 for the target input mode directly in front of the targeted application icon 312 and within the guide element 350.

The guiding element 350 may be seen as a dedicated area of the GUI to prepare for the subsequent step 240 for providing the selected/target input with the selected/target application. Indeed, in a further step 240, the user will provide an input such as a slide or a pinch linking an input icon 322 with an application icon 312 to select respectively the corresponding (i.e. associated) input and corresponding (i.e. associated) application. The user input for selection may be any user input encompassing an input icon with an application icon. For instance, in a gamification approach wherein the icons are motion enabled, the user may push, or pull and release, the input icon to give it momentum in the direction of an application icon. The linking will be the result of the moving input icon travelling over the application icon on the GUI. A pinch or slide type of input may be facilitated with the guide element 350 as the user only needs to move his fingers within the element 350.

The user input to link an input icon with a respective application icon may be performed in a direction substantially normal to the scrolling direction 315/325. To do so, the user will reposition the scrolling lists in step 220 such that he places the target input icon 322 next to the target application icon 312 as seen in FIG. 3A, for instance using the guide element 350. The user then can easily link these icons using a simple pinch or slide performed in a direction normal to the scrolling direction.

Once both application and input mode have been selected in step 240, in a subsequent step 250, the processor will execute the selected application using the selected input mode.

In a further step 260, the result of the executing may be provided on the GUI of the electronic device. Using the exemplary illustration of FIG. 3A, a user may want to add pictures to a slideshow on a project. Using known techniques, he would have to take new pictures with the camera, go to the image library, select the ones he wants to add to his presentation and select the slideshow option. Thanks to the present system, all he needs to do is position the camera icon 322 on the second scrollable list 320 of FIG. 3A in front of the slide show icon 312 from the first scrollable list 310, and pinch both icons 312 and 322 together. As a result of the execution of the slideshow application with the selected camera input, the slideshow application will open with for instance the page from the image library to select the pictures or the camera will be activated and any picture taken subsequently will be added to the slideshow. This directly results, beyond increase ergonomic of the interface, in shorter processing time and fewer interactions with the user.

Using a social network application example, a user today to check in at a location needs to:
open the social network application,
select the check-in menu button,
wait for the location sensor to pick-up the location and the application to provide a selection of locations corresponding to the location sensor result.

Using the present system, once the location input icon 323 is positioned in front of the social network application icon 311, a sliding input linking the two icons will cause the social network application to open at the check-in page and provide immediately a list of possible candidate location.

Thanks to the present system, an easier and straightforward selection mechanism is proposed, reducing the number of inputs needed to perform actions/functions in relation to an input. It results in an ergonomic approach valid across registered applications and input modes. The present system may be seen as a solution to provide shortcuts to the execution of an application selected with an input mode.

In the exemplary implementations of FIGS. 3A to 3C, the applications of the first list 310 are compatible with any of the proposed entry/input modes of the second list 320. When registering a new application or a new input mode, as mentioned here before, the element will declare a configuration file, i.e. the type of other elements it is compatible with, or support as an entry for execution. In an additional embodiment of the present system, a compatibility check may be performed after detecting the selected application and input mode. In other words, as each application is associated to one or more inputs it is compatible with, and each input is associated to one or more applications it is compatible with, the executing of step 250 will further comprise a step of discarding the user input when finding that the selected input mode is not compatible with the selected application. A visual feedback may be provided to the user such as the lack of any further reaction from the GUI, the return of the icon(s) to their initial position or a vibration of the selected icons to signal the incompatibility.

The present GUIs may also be adapted to take into account the cases wherein the input modes and the applications may not be compatible. Instead of sending a user feedback, one of the lists may be updated to present input or output icons compatible with the user selection. In an additional embodiment of the present system, illustrated in FIG. 3B, the electronic device 100 is operatively linked to a database storing:
a first plurality of elements of the first type, each of them corresponding to an application icon representing an application, and;
a second plurality of elements of the second type, each of them corresponding to an input icon representing an input mode for one or more applications
wherein the elements of one type are linked to a plurality of elements of another type based on a compatibility criterion.

Such a database allows retrieval of the elements of the other type that are compatible with a selected element. In the present embodiment, the user will select one icon from the first list 310 in FIG. 3B or second list 320 as the active icon. This may be for instance an application icon 3120, here illustrated as a cart icon, as seen in FIG. 3B. This cart application 3120 may not be compatible with the list 320 of input modes as seen for instance in FIG. 3A as the cart application does not support a location, a picture or a microphone input. To update the GUI, the processor will retrieve in the database the elements linked to the active icon, i.e. the input modes linked to the cart application. In this present example, this may be payment modes, like a mobile wallet, PayPal™, a credit card or a mobile account through the operator. The processor will then proceed, once the application icon becomes the active icon, to update the list without the active icon, i.e. updating the input icon list, using the icons associated to the retrieved elements. As seen in FIG. 3B, the second list of input mode icons has been updated (i.e. replaced) to display input icons 3210 to 3240, associated respectively to the input modes mobile wallet, PayPal™, credit card and the mobile account.

The user can then provide an input on the updated list in the scrollable direction to reposition the sought input/payment mode in front of the cart application icon. The user can then resume the present method using an input to link the input and output icons, here illustrated in the guide element 350.

Illustration was provided here with the input element being an input mode, i.e. a camera, a text editor, a location sensor, a microphone . . . In an additional embodiment of the present method, the input element may simply be an input file or data, i.e. the results of an input mode. This is particularly well suited when the application is a standalone application. For instance, the picture gallery application of the electronic device may use the present system to use the stored pictures across different applications such as MMS, social network, email and any other applications that can use a picture as an input file or parameter. Each time a picture is taken, the second list of inputs, i.e. the second list of pictures will increase in length and the icon corresponding to each picture in the second list may be a snippet, i.e. a small version of the picture. The user will then just move the chosen picture icon to a position opposite the intended recipient application, e.g. a social network application. The input across the selected picture and the selected application will lead to the execution of the application with the picture as en entry, e.g. the posting of the picture to the user's wall.

Another illustration would be a search engine. The first scrollable list could show search applications like Google™, Wikipedia™, Bing™ . . . while the second list of entries would show icons/snippets of the recent text entries from the user like a product, a location . . . Android devices can show a widget that shows the status and recent searches of the user. Such a widget could add the present GUI with the two lists of applications and entries based on the recent usage of the device by its user.

FIG. 3C is another illustration of a standalone implementation, showing an application to customize different items for sale. Colors may be available to a user to choose as input through a color palette provided as the second scrollable list 320. The color palette may comprise a plurality of colors represented with input icons 3210 to 3240. The outputs to be customized are illustrated as a clock, a shoe or a bike, represented respectively through the output icons 311, 3120 and 313. The output icons here actually represent a coloring function of the application that will allow the user to customize the items presented by the output icons using one or more of the color inputs from the second list 320. Once an item to be colored, e.g. a shoe represented by the shoe icon 3120, has been positioned opposite an input icon for a color, here represented color icon 3220, the user can impart a touch input to link the two icons. A pinch or a slide linking icons 3120 and 3220 will cause the processor of the electronic device 100 to store in a database an indication that the user wants to buy a pair of shoes with a selected color. As a visual output to the user, a GUI may be updated with zooming in on the output icon 3120, updating its color to the color corresponding to the input icon 3220.

The present GUI of FIG. 3C may also be the result of the plugin component implementation, wherein an application calls an available plugin or library to render a GUI to the user. Such an application would declare to the plugin:

the list of items to be manipulated, corresponding to the output icons, the list of input modes to be used as parameters or inputs.

Using such lists, the plugin would lead the application to render a GUI as illustrated in FIG. 3C.

The plugin architecture implementation was illustrated with an automatic update the list of applications or input modes, as described in step 200 of FIG. 2. Alternatively, as illustrated in the GUI of FIG. 4, the user may add himself a new application or a new input mode to the two lists of elements eligible for the present selection method. To do so, one of the available icons on either scrollable list 410 (application icons) or 420 (input icons) may be dedicated to adding one or more elements to the list it belongs to. Here, icon 460, shaped as a "+" sign, allows the user, when selected, to update the list of registered applications (respectively registered input modes). For instance, a user input on icon 460 will cause the processor to display the list of applications or new applications that the user may select, so as to add a corresponding application icon to the first list.

Although the present disclosure has been described with reference to one or more examples, workers skilled in the art will recognize that changes may be made in form and detail without departing from the scope of the disclosure and/or the appended claims. For instance, the present disclosure was described in relation with a first list of application icons and a second list of input icons. The present teaching may also be available with a GUI displaying at least one application icon and at least one input icon, one of the at least one application icon or the at least one input icon being part of (or shown as) a list of icons movable along the first direction of the GUI. The one or more user inputs in the first direction will cause the processor of the electronic device to move the list along the first direction so as to place one input icon in proximity with one application icon. A user input linking an input icon with an application icon will select the respective input mode and application will, as described before, causing the processor to execute the selected application with the selected input mode.

The invention claimed is:

1. A method for executing an application through a user interface displayed by an electronic device, the method comprising the steps of:

displaying on the user interface at least one application icon, an application icon being associated to an application, displaying on the user interface at least one input icon, an input icon being associated to an input mode for one or more applications, both the at least one application icon and the at least one input icon being part on the user interface respectively of a first and second list of icons movable along a first direction of the user interface, capturing one or more user inputs along the first direction to move the list of icons in the first direction, detecting a user input linking an input icon with an application icon to select respectively the associated input mode and application, executing the selected application using the selected input mode, wherein the electronic device is operatively linked to a database comprising a plurality of elements of a first type, and another plurality of elements of a second type, the elements of one of the first and second types being linked to a plurality of elements of the other of the first and second types based on compatibility, and wherein the capturing of one or more user inputs further comprises:

selecting one icon from one of the first or second lists as an active icon, retrieving in the database the elements linked to the active icon, and updating the other of the first and second lists using the icons associated to the retrieved elements.

2. The method according to claim 1 wherein the method further comprises:

providing on the user interface the results of the executing.

3. The method according to claim 1 wherein the input for one or more applications corresponds either to an input mode or an input data.

4. The method according to claim 1, wherein each application is associated to one or more inputs it is compatible with, and each input is associated to one or more applications it is compatible with, the executing step further comprising:

discarding the user input when finding that the selected input mode is not compatible with the selected application.

5. The method according to claim 1, the capturing step comprising:

capturing one or more user inputs along the first direction to move the first and second lists with respect to one another.

6. The method according to claim 5, wherein the applications represented by the first list of application icons correspond each to a function of an application program, the inputs corresponding to inputs compatible with the application program.

7. The method according to claim 1, wherein the plurality of elements of the first type each correspond to an application icon representing an application, and the plurality of elements of the second type each correspond to an input icon representing an input mode for one or more applications.

8. The method according to claim 1, wherein the capturing one or more user inputs further comprises:

capturing one user input on the updated list.

9. The method according to claim 1, comprising the preliminary step of:

retrieving in a database a list of registered inputs and applications, each one being associated to a respective icon displaying the first and second lists of icons using the icons associated to the retrieved list.

10. An electronic device comprising a display device and storing at least one application, the electronic device comprising a processor configured to:

display on the display device a user interface comprising at least one application icon, an application icon being associated to an application, display on the user interface at least one input icon, an input icon being associated to an input mode for one or more applications, both of the at least one application icon and the at least one input icon being part on the user interface respectively of a first and second list of icons movable along a first direction of the user interface, capture one or more user inputs along the first direction to move the list of icons in the first direction, detect a user input linking an input icon with an application icon to select respectively the associated input mode and application, execute the selected application using the selected input mode, wherein the electronic device is operatively linked to a database comprising a plurality of elements of a first type, and another plurality of elements of a second type, the elements of one of the first and second types being linked to a plurality of elements of the other of the first and second types based on compatibility, and wherein the capturing of one or more user inputs further comprises:

selecting one icon from one of the first or second lists as an active icon, retrieving in the database the elements linked to the active icon, and updating the other of the first and second lists using the icons associated to the retrieved elements.

11. A computer program non-transitory computer-readable storage medium comprising a program product stored thereon and executable by a computer in the form of a software agent including at least one software module set up to implement the method of claim 1.

12. The method according to claim 1, wherein the capturing comprises positioning a selected said application icon and a selected said input icon in proximity with each other, and the detecting comprises detecting a user input linking the selected input icon with the selected application icon to select respectively the associated input mode and application.

13. The method according to claim 1, further comprising displaying a guide element on the user interface, and wherein the positioning in proximity comprises positioning at least one of the selected icons so that the selected input icon and the selected application icon coincide with the guide element.

* * * * *